No. 824,477. PATENTED JUNE 26, 1906.
H. GANDAR.
GAS BROILER.
APPLICATION FILED JULY 15, 1905.
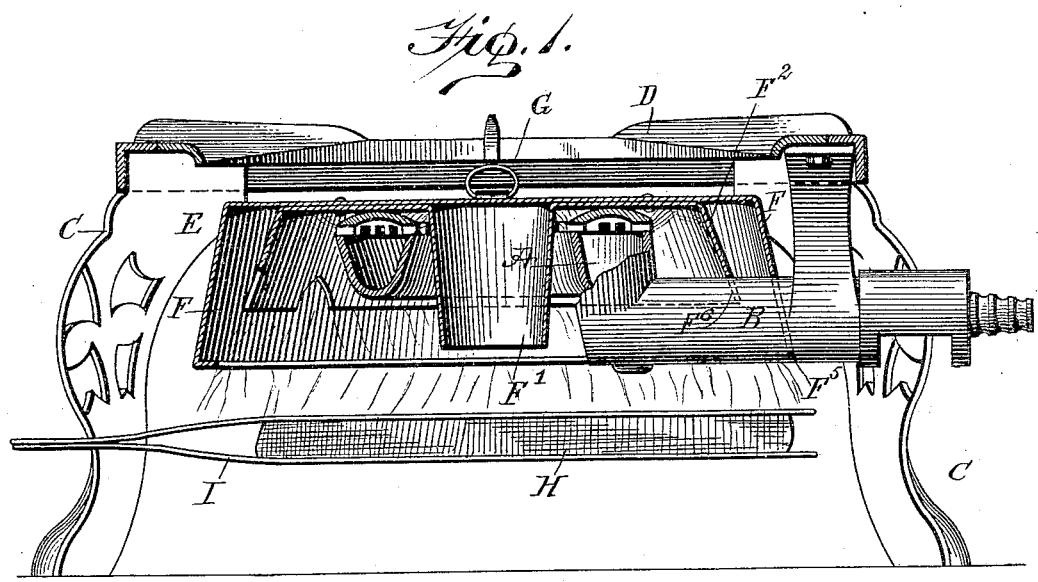
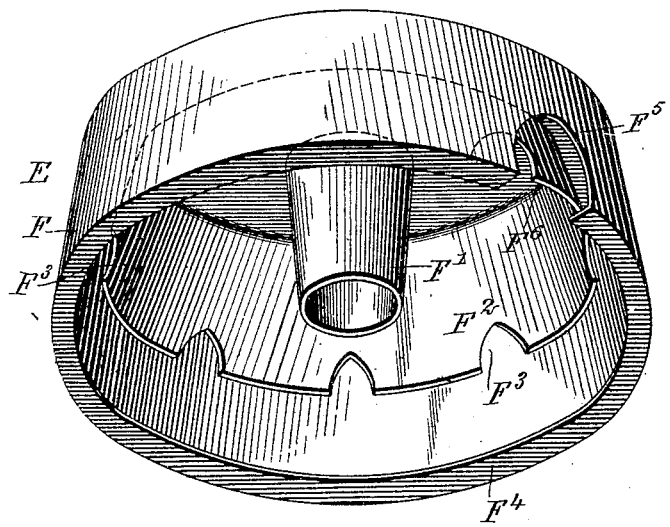
WITNESSES:
INVENTOR
Henry Gandar
BY
ATTORNEYS

UNITED STATES PATENT OFFICE.

HENRY GANDAR, OF NEW YORK, N. Y.

GAS-BROILER.

No. 824,477.           Specification of Letters Patent.           Patented June 26, 1906.

Application filed July 15, 1905. Serial No. 269,869.

*To all whom it may concern:*

Be it known that I, HENRY GANDAR, a citizen of the United States, and a resident of the city of New York, borough of Manhattan, in the county and State of New York, have invented a new and improved Gas-Broiler, of which the following is a full, clear, and exact description.

The object of the invention is to provide a new and improved gas-broiler adapted for convenient attachment to ordinary gas-stoves and arranged to permit of proper broiling of the meat or other food product and without danger of losing any of the juice or causing undesirable smoke.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in both views.

Figure 1 is a sectional side elevation of the improvement as applied to an ordinary single-burner gas-stove, and Fig. 2 is a perspective view of the improvement.

The gas-stove on which the improvement is shown applied consists of the usual ring-shaped burner A, provided with a gas-supply pipe B, connected with a suitable gas-supply and supported on a frame C, carrying a removable grate D directly above the burner B, so that when the gas-stove is in use the burner-flame in rising through the grate D, heats the vessel resting on the grate D. The broiler E is adapted to be placed directly on the burner A on removing the grate D and the broiler consists, essentially, of an inverted cup-shaped deflector F, resting on the top of the burner A and provided at its middle with a depending core F', extending loosely in the opening of the ring-shaped burner A, as plainly illustrated in Fig. 1. The core is preferably in the form of an inverted frustum of a cone. In the deflector F is also arranged an annular flange F², extending outside of the burner A and spaced from the rim of the deflector F. The lower edge of the flange F² is provided with notches F³, and the said flange is preferably inclined downwardly and outwardly, and its lower edge terminates above the lower edge of the rim of the deflector F. The notches F³ allow the flame to pass quickly and in an irregular manner into the deflector F. The latter is preferably provided at its lower edge with a narrow, inwardly-extending flange F⁴ for preventing the flame from leaping around the lower edge of the rim of the deflector to the outside thereof. The rim of the deflector F and the flange F² are provided with registering cut-out portions F⁵ and F⁶ for the passage of the supply-pipe B, as will be readily understood by reference to Fig. 1. The top of the deflector F is provided with a handle G for conveniently placing the broiler in position on the burner or removing it therefrom.

The article H to be toasted and supported in a suitable broiler I is held below the broiler E, as indicated in Fig. 1, and when the gas is lighted at the burner A the flame and heat developed is directed downwardly onto the article to broil or toast the same. The ring-shaped burner A has an inner and outer flame, of which the inner flame is directed downward by the core F' and the outer flame is directed downward by the flange F², so that both flames are utilized and by the deflector F are prevented from scattering and are confined over the article H to insure a proper and quick broiling thereof.

While the broiler E is in use, the grate D may be placed in position on the frame C and used for supporting a kettle or like vessel, so that a portion of the heat radiating or passing upwardly from the broiler may be used for heating the vessel and its contents.

The broiler described is very simple and durable in construction, can be readily placed in position over the gas-stove or removed therefrom when not needed, and no change whatever is required in the ordinary construction of the gas-stove. The broiler may be cast in one piece or made of several parts fastened together.

Having thus described my invention, I claim as new, and desire to secure by Letters Patent—

1. A broiler attachment for gas-stoves having a ring-shaped burner, comprising a deflector formed of an inverted cup adapted to rest on the burner and provided with a central depending core extending in the opening of the burner, and an annular flange depending from the cup between the rim thereof and the said core.

2. A broiler attachment for gas-stoves having a ring-shaped burner, comprising a deflector formed of an inverted cup adapted to rest on the burner and provided with a central depending core extending in the opening of the burner, and an annular flange depending from the cup between the rim thereof and the said core, the lower edge of the flange being notched and terminating above the lower edge of the rim of the cup.

3. A broiler attachment for gas-stoves having a ring-shaped burner, comprising a deflector formed of an inverted cup adapted to rest on the burner and provided with a central depending core extending in the opening of the burner, and an annular flange depending from the cup between the rim thereof and the said core, the said rim and flange having registering cut-out portions for the passage of the supply-pipe of the burner.

4. A broiler attachment for gas-stoves having a ring-shaped burner, comprising a deflector formed of an inverted cup having a narrow inwardly-extending flange at the lower edge of its rim, the said cup being adapted to rest on the burner and provided with a central depending core extending in the opening of the burner, and an annular flange depending from the cup between the rim thereof and the said core, the lower edge of the flange being notched and terminating above the lower edge of the rim of the cup, and the said flange extending downwardly and outwardly.

5. A broiler attachment for gas-stoves having a ring-shaped burner, comprising a deflector formed of an inverted cup having an inwardly-extending flange at the lower edge of its rim, the said cup being adapted to rest on the burner and provided with a central depending core arranged to extend in the opening of the burner, and an annular flange depending from the cup between the rim thereof and the said core.

6. A broiler attachment for gas-stoves having a ring-shaped burner, comprising a deflector formed of an inverted cup having an inwardly-extending flange at the lower edge of its rim, the cup being adapted to rest on the burner and provided with a central depending core extending in the opening of the burner, and an annular flange depending from the cup between the rim thereof and the said core, the said rim and flange having registering cut-out portions for the passage of the supply-pipe of the burner.

In testimony whereof I have signed my name to this specification in the presence of two subscribing witnesses.

HENRY GANDAR.

Witnesses:
WALTER STEPHEN BEDIENT,
C. D. CONNELLEY.